Nov. 13, 1962 J. WOLLENHAUPT 3,063,708
ELECTRO-MECHANICAL CLAMPING DRIVE WITH ELECTRIC CONTROL
Filed May 6, 1959 10 Sheets-Sheet 1
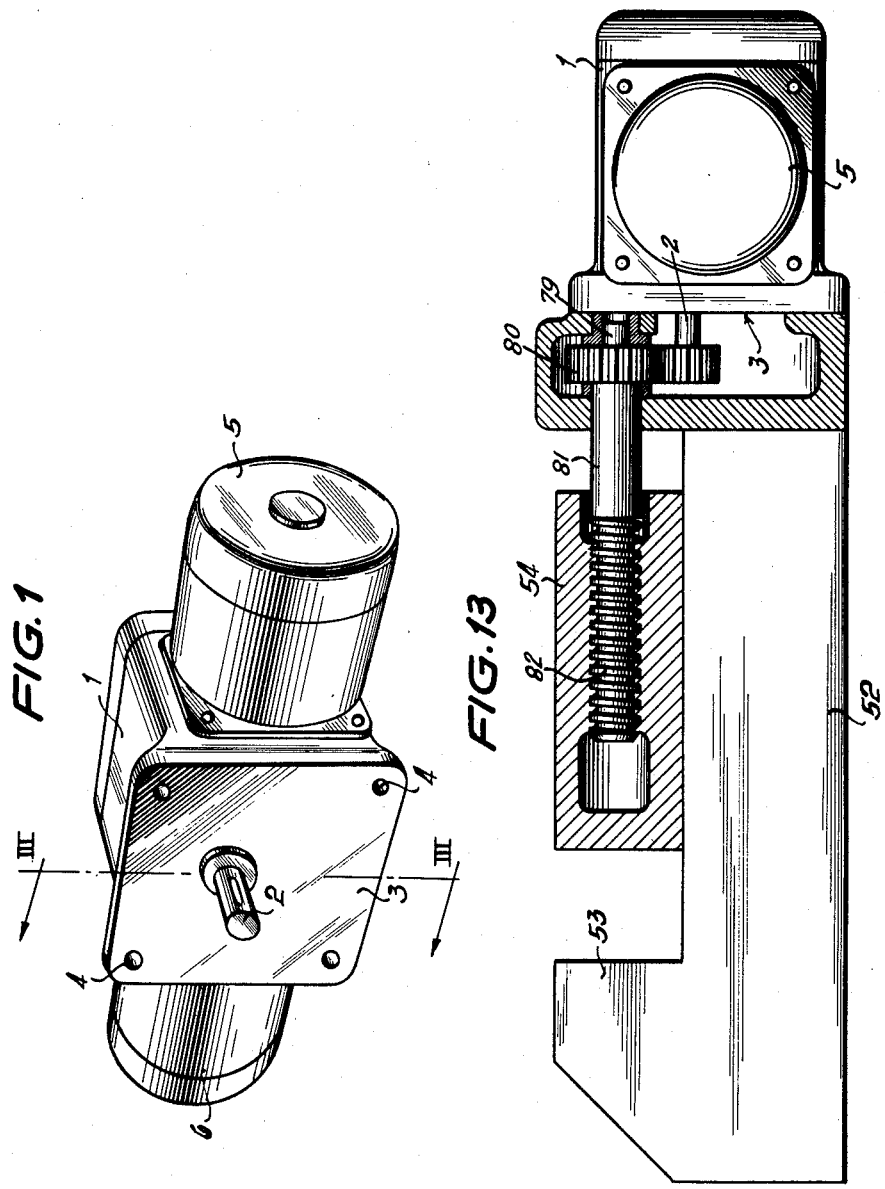
INVENTOR
Jakob Wollenhaupt
By
Patent Agent

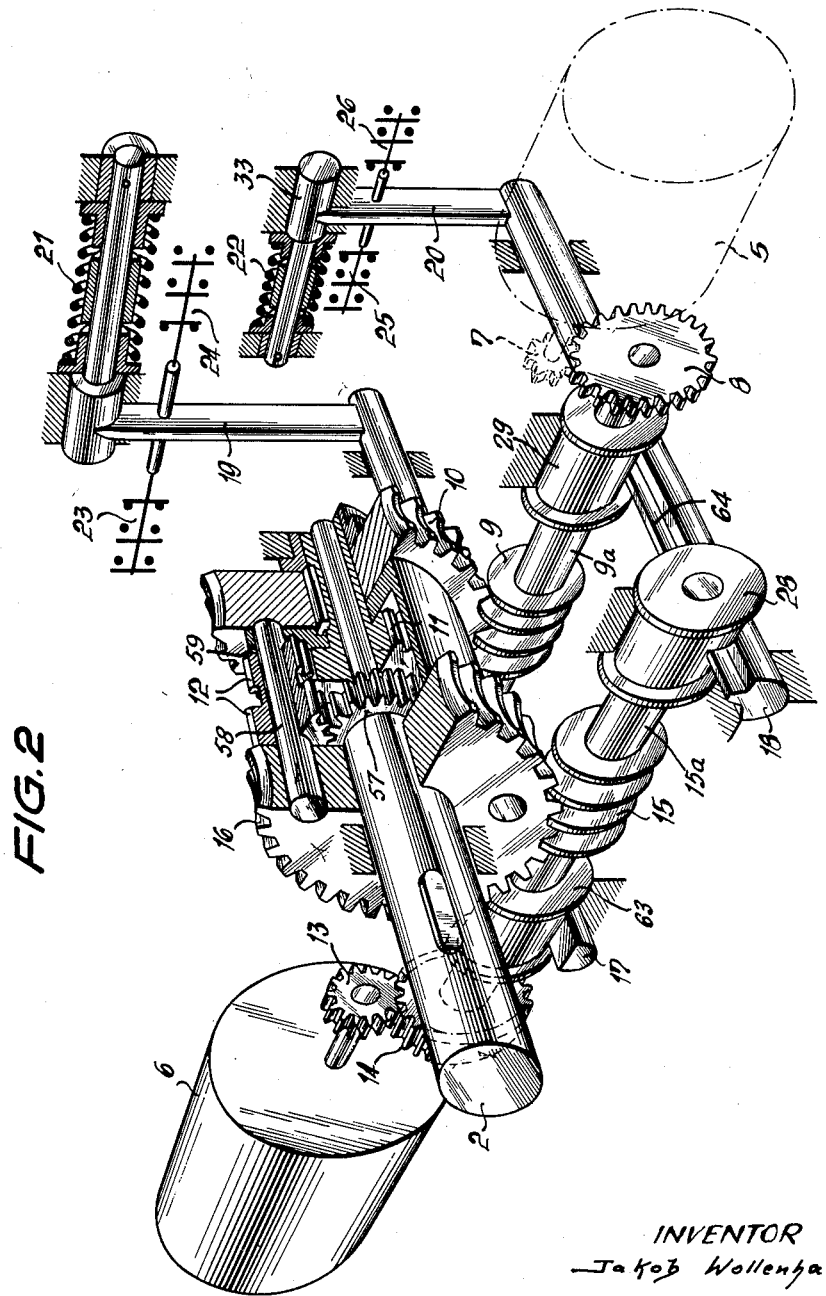

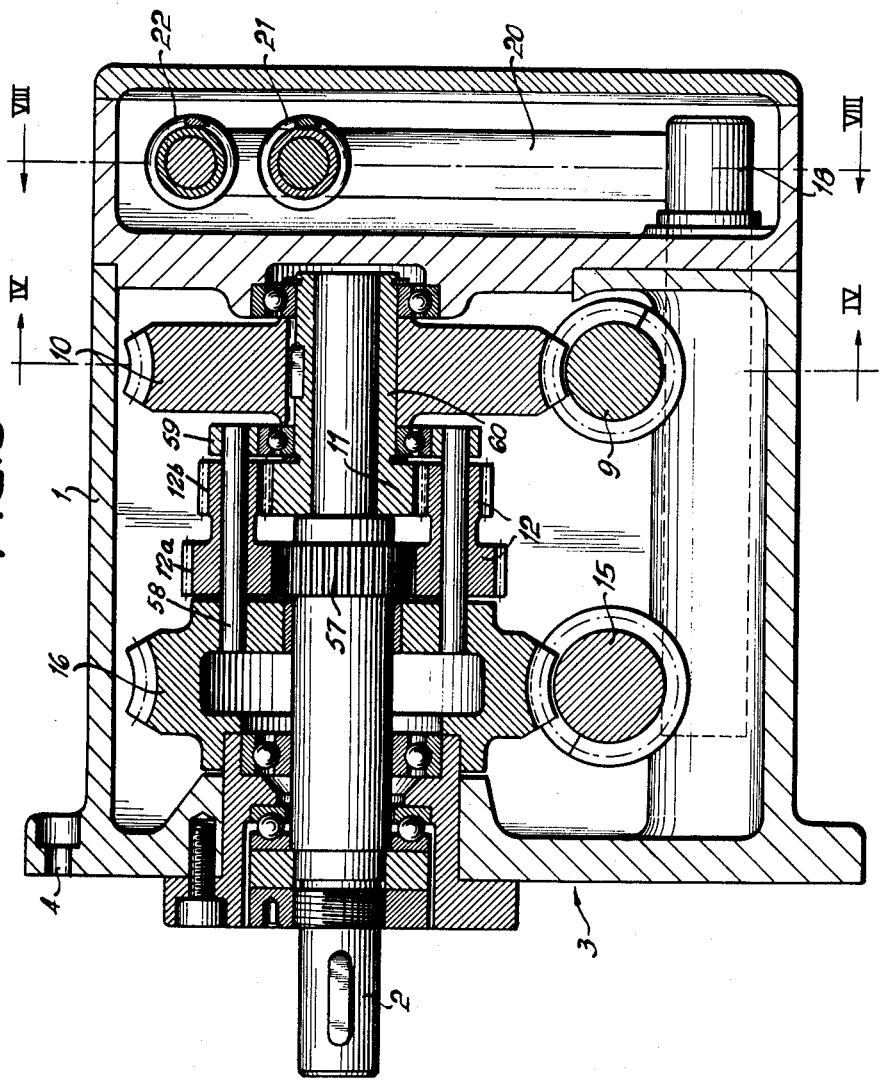

Nov. 13, 1962  J. WOLLENHAUPT  3,063,708
ELECTRO-MECHANICAL CLAMPING DRIVE WITH ELECTRIC CONTROL
Filed May 6, 1959  10 Sheets-Sheet 4
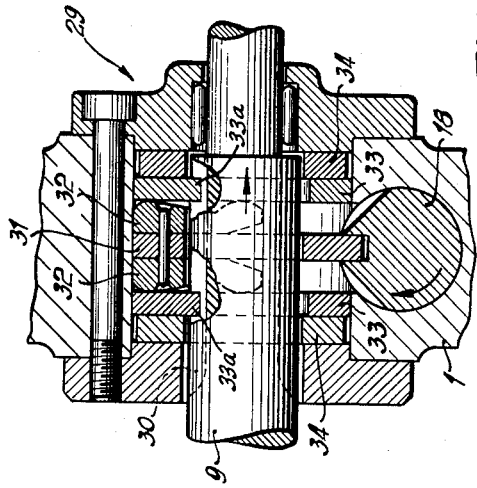
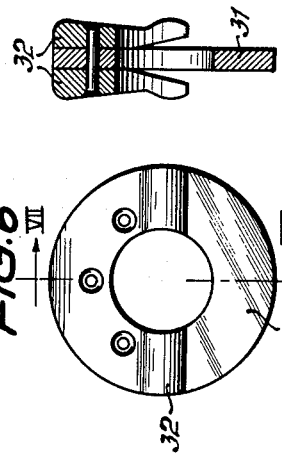
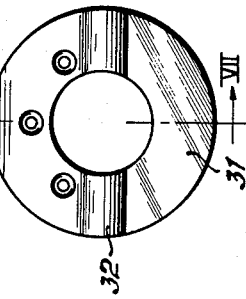
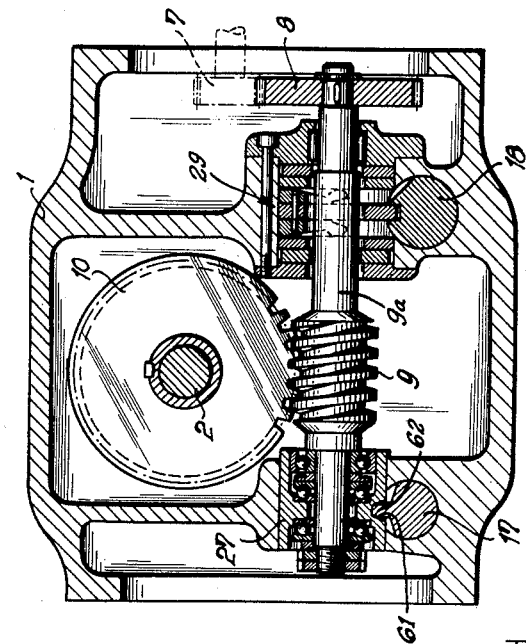
INVENTOR
Jakob Wollenhaupt
By
Patent Agent

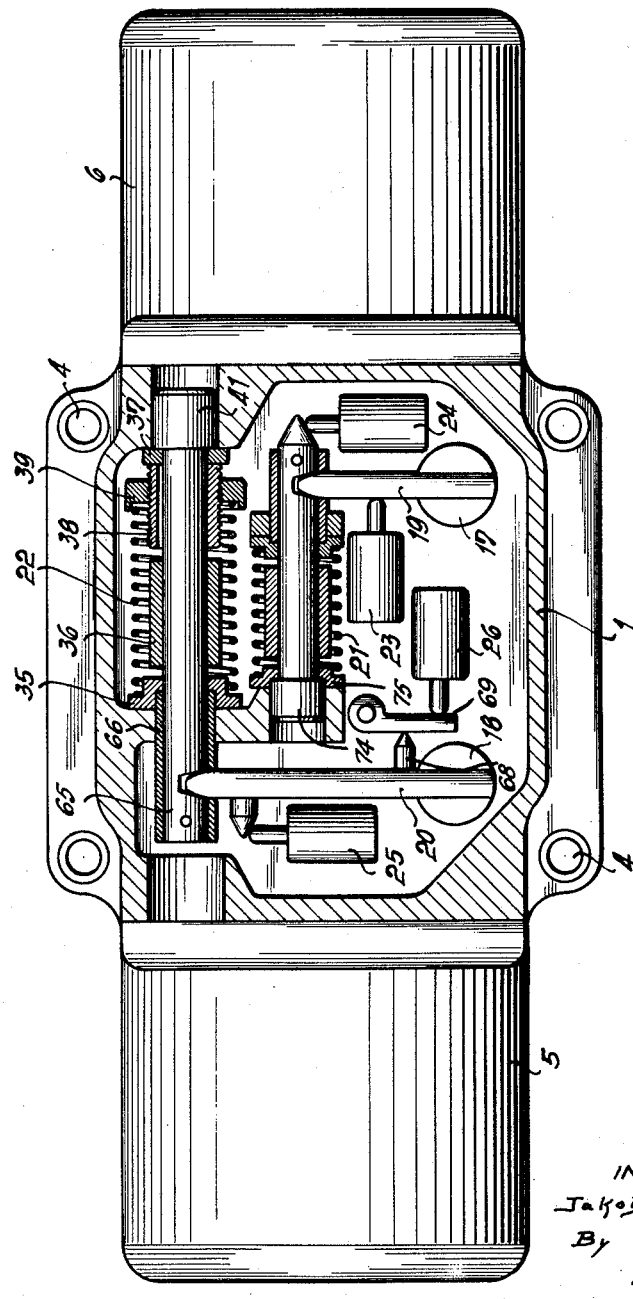

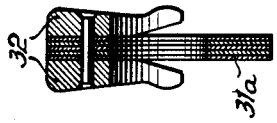
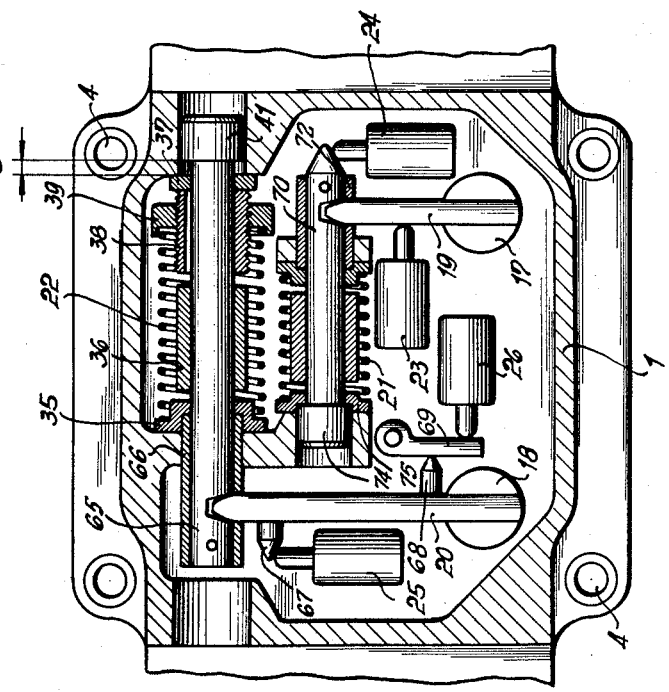

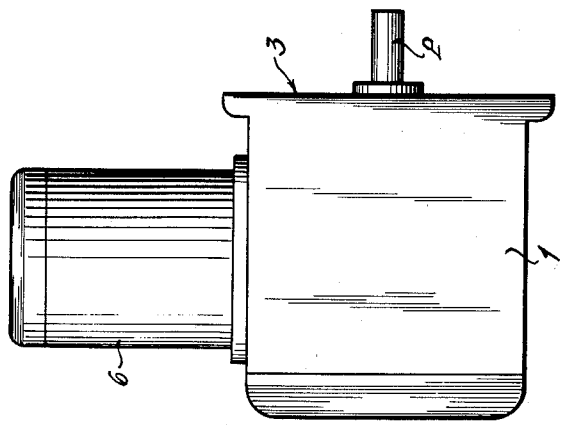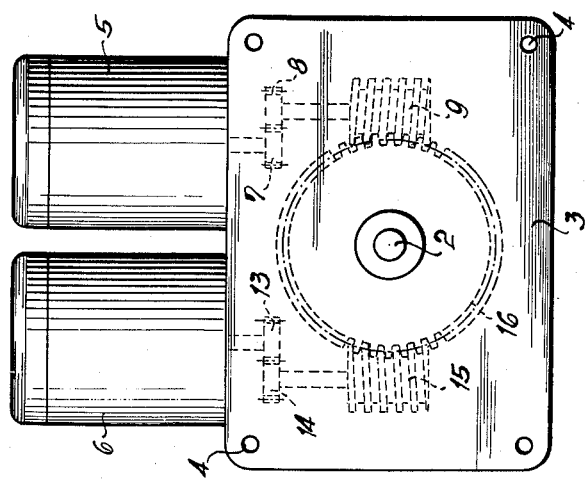

Nov. 13, 1962     J. WOLLENHAUPT     3,063,708
ELECTRO-MECHANICAL CLAMPING DRIVE WITH ELECTRIC CONTROL
Filed May 6, 1959     10 Sheets-Sheet 8

INVENTOR
Jakob Wollenhaupt
By
Patent Agent

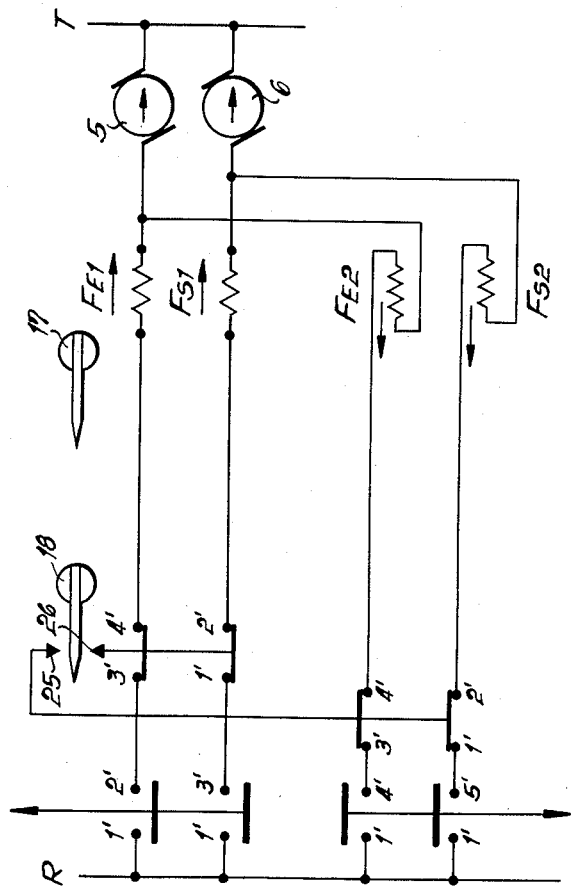

United States Patent Office 3,063,708
Patented Nov. 13, 1962

1

3,063,708
ELECTRO-MECHANICAL CLAMPING DRIVE
WITH ELECTRIC CONTROL
Jakob Wollenhaupt, Koln-Bruck, Germany, assignor to
Gebrüder Honsberg, Remscheid-Hasten, Germany
Filed May 6, 1959, Ser. No. 811,374
Claims priority, application Germany May 9, 1958
13 Claims. (Cl. 269—216)

The present invention relates to an electromechanical drive for clamping devices with clamping jaws adapted to move at a fast traverse speed up to the work piece to be clamped and thereupon to clamp the same. With such an arrangement, the clamping device is driven by the output shaft of a planetary gear transmission one element of which, namely, the fast traverse element is driven by a fast traverse motor, whereas another element is driven by a clamping motor through the intervention of a travelling, or axially displaceable, worm which is axially resiliently displaceable and which is drivingly connected with a worm wheel of the planetary gear transmission.

Drive systems of the above mentioned type have been suggested as fast traverse and feed transmissions which are also suitable for clamping work pieces in machine tools or the like. When employing such feed transmissions as clamping drives experience has shown that the overall dimensions of the drives are so great that the transmissions are frequently unsuitable for the desired installation in machine tools or the like. These transmissions are furthermore not suitable to drive at fast traverse speed against a fixed abutment. In connection with the clamping operation, it is necessary that such drives are reversed shortly before reaching the respective abutment.

This drawback is of particular importance when the clamping drives are to be employed as packaged units for installation in machines which are put together in conformity with the building block principle. The reason for the disadvantageous size of these suggested clamping drives is to be found primarily in the fact that motors for fast traverse and feed movement must have relatively great dimensions.

It is, therefore, an object of the present invention to provide a clamping drive which will overcome the above mentioned drawbacks.

It is another object of this invention to provide an electromechanical clamping drive which will considerably simplify heretofore known clamping drives while requiring a minimum of space.

It is also an object of this invention to provide a clamping drive according to the preceding paragraphs, which will, in a minimum of time, produce high clamping forces.

These and other objects and advantages of the invention will appear more clearly from the following specification in connection with the accompanying drawings, in which:

FIG. 1 is a perspective view of a clamping drive according to the invention.

FIG. 2 illustrates partly in section and partly in perspective view the construction of the clamping drive according to FIG. 1.

FIG. 3 represents a longitudinal section through a clamping drive according to FIGS. 1 and 2, said section being taken along the line III—III of FIG. 1.

FIG. 4 is a section through the bearing of the fast traverse worm for us in connection with a clamping drive according to FIGS. 1 to 3 and is indicated by line IV—IV of FIGURE 3.

FIG. 5 illustrates the transfer of the axial movement of the clamping worm to the mechanical brake of the fast traverse worm and is a portion of FIGURE 4 drawn at enlarged scale.

FIG. 6 illustrates the braking actuating disc for a clamping drive according to FIGS. 1 to 4.

FIG. 7 shows a section through the arrangement of FIG. 6 taken along the line VII—VII of FIG. 6.

FIG. 7a is a modification of the arrangement of FIG. 7.

FIG. 8 is a sectional view taken on line VIII—VIII of FIGURE 3 illustrating the arrangement of the springs and switches of a clamping drive according to FIGS. 1 to 6.

FIG. 8a is a section similar to that of FIG. 8 but for a different embodiment of the invention.

FIG. 9 shows a modified clamping drive according to the invention with two motors arranged parallel to each other on the same side of the drive.

FIG. 10 is an end view of the transmission drive shown in FIG. 9 as seen from the left-hand side of FIG. 9.

FIG. 11 illustrates as an example the drive of a fast clamping drilling device for us in connection with the clamping drive according to the invention.

FIG. 12 illustrates as further example the drive of a hydraulic piston by means of the clamping drive and the transfer of the pressure to a clamping piston.

FIG. 13 illustrates as example the drive of a vise-like clamping device by a clamping drive according to the invention.

Figure 14:
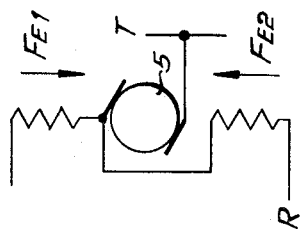

FIG. 14 diagrammatically illustrates a universal motor with a winding for clockwise rotation and a winding for counter-clockwise rotation.

Figure 15:
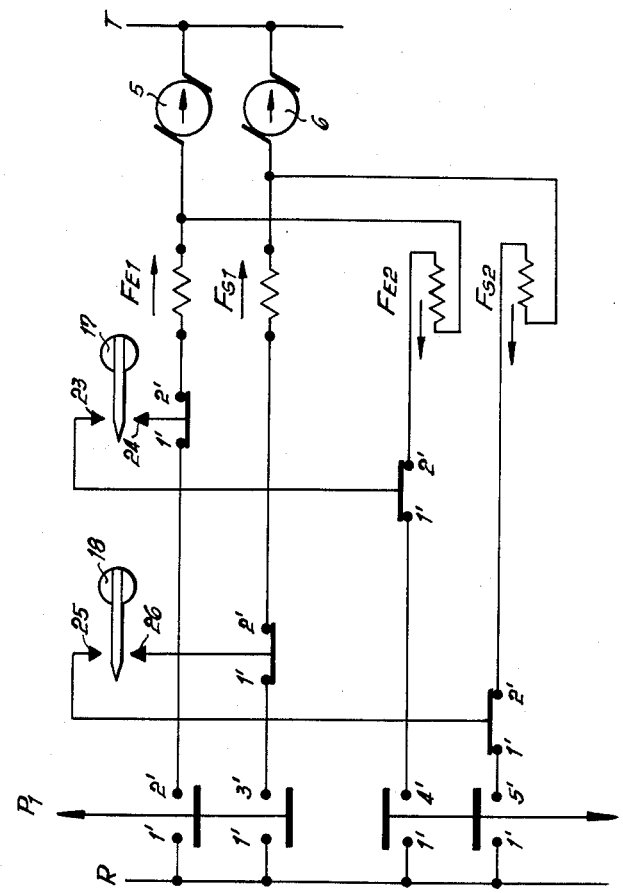

FIG. 15 is a circuit diagram of an automatic control system for maintaining the clamping pressure constant.

FIG. 16 is a circuit of a further and improved embodiment of the invention.

*General Arrangement*

Clamping operations generally require first a fast adjustment of the clamping jaws until they engage the work piece to be clamped, and then a clamping of the work piece.

The fast adjustment requires that merely minor forces are exerted by the fast traverse motor but that frequently a considerable stroke at high speed will be carried out. For purposes of the subsequent clamping, i.e. for producing the necessary clamping pressure, the clamping motor has to furnish greater forces, but only very short strokes are required because the clamping jaws already engage the work piece, and the stroke to be performed corresponds substantially merely to the elastic deformation of the work piece and clamping device.

According to the present invention, the fast traverse motor drives the fast traverse drive shaft of the planetary gear transmission through an axially resiliently displaceable travelling worm and a worm wheel meshing therewith, while both drives act upon a common output shaft through the intervention of the planetary gearing of the transmission.

In this way, it will be possible to employ very small motors for the traverse adjustment as well as for the clamping operation. Preferably two ordinary flanged or like motors of the same size are employed.

By distributing the switching functions which heretofore were associated with one travelling worm, to the two travelling worms, a particularly simple electric control of the clamping drive will be obtained which at the high stress to which every clamping drive is subjected will be of great advantage in view of the high switching precision and safety.

It has been found particularly advantageous to design the worms as axially resiliently displaceable travelling worms which will convey to electric limit switches the axial displacement which will result when the clamping jaws hit the work piece to be clamped. The said limit switches then turn off the fast traverse motor and if desired may turn on the clamping motor. If the axial displacement of the travelling worm is conveyed at the desired clamping pressure, to electric limit switches, the said electric limit switches will also turn off the clamping motor.

In conformity with a further development of the invention, a reduction of the drive may be obtained by employing a planetary gear transmission for producing a high transmission ratio between the feed motor and the output shaft. For materializing this idea of the invention, gear sets with a very low difference in the pitch circle and pitch diameter or in the number of the teeth are employed for the planetary gear drive. In this way, with a minimum of gears, almost any high stepdown ratio can be obtained. In this way, there exists the possibility to produce high clamping forces by means of very small clamping motors.

If, for instance, for the first gear pair the value 17/25 is employed for the ratio of sun wheel to planetary gear, and if for the second gear pair the ratio 16/26 is employed, it is possible without difficulty by this selection of the gears to obtain a stepdown ratio of more than 1:10. When employing corrected gear wheels with very low pitch diameter differences, transmission ratios of 1:100, 1:1000 and 1:10000 will be possible without difficulties.

In conformity with a further simplification of the clamping drive according to the invention, the clamping travelling worm and the worm wheel which it drives are self locking, i.e. the worm drives the worm wheel but the worm wheel cannot drive the worm, whereas the fast traverse clamping worm is not self-locking. For conveying the axial displacement of the clamping travelling worm to a mechanical restraining or arresting device acting upon the fast traverse travelling worm, means are provided for braking the fast traverse travelling worm. The above mentioned means and arresting devices are so adjusted that the fast traverse worm, even after disconnecting the fast traverse motor, will quickly come to a standstill and will be prevented from turning backwards or from springing back. Due to the provision of a separate worm for the fast traverse motor, in conformity with the present invention, and due to the design of said fast traverse worm as a travelling worm in conformity with the invention, it is furthermore made possible to provide a very simple and strong mechanical braking effect instead of the heretofore necessary electromechanical braking of the fast traverse motor. The braking force is mechanically derived from the clamping travelling worm. As a result thereof, a considerable improvement of the safety of operation of the clamping drive is obtained in addition to a considerable decrease in production cost for such drives.

*Structural Arrangement*

Referring now to the drawings in detail and to FIG. 1 thereof in particular, FIG. 1 shows a housing in which the clamping drive according to the invention is mounted. From housing 1 protrudes an output shaft 2 which may be connected to coupling means for coupling the clamping drive to the clamping device to be operated. The wall of the housing 1 from which the output shaft 2 protrudes is designated with the reference numeral 3 and is designed so as to allow flanging of said housing to the clamping device to be driven. To this end, wall 3 is provided with bores 4 for receiving connecting bolts. Wall 3a of housing 1 has flanged thereto a fast traverse motor 5, whereas the oppositely located wall 3b has flanged thereto a clamping motor 6.

As will be evident from FIGS. 2 to 8, fast traverse motor 5 is adapted operatively to be connected with a non-self-locking axially moveable or travelling worm 9 with multiple thread through the intervention of a pinion 7 and a gear 8. Worm 9 is mounted on shaft 9a so as to rotate therewith. The fast traverse travelling worm 9 actuates the worm wheel 10 which is attached to sun wheel 11 of a planetary gear transmission generally designated 11a. The sun wheel 11 meshes with pinion 12b of the double planetary gear 12, the second pinion 12a of which meshes with gear 57 of input shaft 2 and thus acts upon the latter. This describes the power flow from the fast traverse motor 5 to the output shaft 2 and also explains the creation of the fast traverse movement. The planet gears 12 are rotatable on shafts 12b which are carried by worm wheel 16.

Clamping motor 6 is adapted through the intervention of spur gears 13 and 14 to actuate the axially moveable or travelling worm 15 which latter meshes in a self-locking manner with the worm wheel 16. The axles 58 of the planetary gears 12 are, on one hand, held in the worm wheel 16 and, on the other hand, in a supporting ring 59 which is rotatably journalled on shaft 60 of sun wheel 11. The planetary gear wheels 12 thus rotate together with the worm wheel 16 designed as the planetary gear carrier. Worm 15 is mounted on shaft 15a so as to rotate therewith.

When the output shaft 2 is braked by the clamping jaws driven thereby engaging the work piece to be clamped, the two worms 9 and 15 are displaced axially. The arrangement is such that first worm 9 is displaced and shortly thereafter worm 15 is displaced. The axial displacement of the worms 9 and 15 is conveyed, as will be explained hereinafter, respectively to springs 21 and 22. Such axial movement of the worms is not sufficient to cause disengagement of their respective driving spur gears 8, 14 from the driving pinion 7, 13. Limit switches 23 and 24 are provided with regard to a lever 19 while limit switches 25 and 26 are so arranged with regard to a lever 20, that the limit switches will be actuated in one or the other direction during the movement of levers 19 or 20, respectively. The limit switches 23, 24, 25 and 26 are connected with the fast traverse motor 5 and clamping motor 6 in such a way that when the clamping jaws engage the work piece to be clamped, fast traverse motor 5 is turned off and clamping motor 6 will continue to run. Thereafter, when the clamping jaws, due to the effect of the clamping motor 6, have exerted the desired clamping pressure upon the work piece to be clamped, the limit switches also turn off the clamping motor 6. Alternatively, the switches could be connected to cause motor 6 to be energized at the instant of de-energization of motor 5.

FIG. 3 particularly clearly shows how the output shaft 2, the worm wheels 10 and 11, as well as the other gears of the planetary gear transmission are journalled. FIGS. 4 to 7 show how the axial displacement of the travelling worm 9 is conveyed to shaft 17 which forms a part of the means provided for braking the travelling worm 9. The shaft 9a on which the worm is fixed has one end journalled in an axially movable bearing bushing 27. This bushing has a groove 27a that received tooth 27b of shaft 17.

The axial displacement of travelling worm 9 thus actuates the bearing bushing and turns shaft 17. Shaft 17 (see FIGURES 3 and 8) has attached thereto lever 19 which it moves against the thrust of spring 21 to actuate switches 23, 24 which serve for turning off the fast traverse motor and if desired for turning on the clamping motor 6. Springs 21 and 22, and the pertaining parts, form centering devices that resist movement of their respective levers 19, 20 in both directions from a center position. When, during the operation of the clamping drive, the clamping jaws engage the work piece to be clamped, and, when the axial displacement of the travelling worm 9 has brought about the turning off of the fast traverse motor 5, shortly thereafter also the travelling worm 15 will be axially displaced. The shaft of the travelling worm 14 is at both ends journalled in bearing bushing 63 and 28 respectively and acts similar to the travelling worm 9 through the bearing bushing 28 upon shaft 18 offset by a longitudinal tooth 64. Through the intervention of shaft 18 and lever 20, also the limit switches 26, 25 are actuated which, as has been explained, may turn on clamping motor 6 if the latter has not yet been turned on by the limit switches 23 and 24. In addition thereto, when the travelling worm 15 is being axially displaced, the movement of shaft 18 brings about actuation of a mechanical clamping device for the travelling worm 9 in conformity with FIG. 5. The clamping device, generally designated at 29 engages the hub of the travelling worm 9 by means of spline 30 of the said hub. Within the range of the clamping device 29, shaft 18 is provided with a follower groove 29a instead of a longitudinal tooth and which groove is engaged by the edge of plate 31. When carrying out a rotation in the direction of the arrow A in FIG. 5 shaft 18 moves brake disc 31 with pressure members 32 connected thereto against the brake disc 33 and 34. Brake discs 33 have teeth 33a extending into spine 30, while discs 34 are plain rings. In this way, the brake disc 34, engages the travelling worm 9 and prevents the latter from turning while simultaneously an axial displacement of travelling worm 9 is prevented. Spline 30, of course, could be a plurality of grooves instead of the single groove illustrated. Inasmuch as shaft 18 is actuated by a self-locking travelling worm 15, a release of the travelling worm 9 is possible only after return axial movement of the travelling worm 15, i.e. during the return stroke of the clamping motor 6. It is particularly advantageous for a universal employment of the clamping drive according to the invention to make the clamping device 29 responsive to an axial displacement of the travelling worm 15 in either direction. To this end, the braking disc 31 is provided on both sides thereof with a pressure member 32. The pressure members 32 are advantageously riveted to the braking disc 31. FIG. 8 particularly clearly shows the arrangement and operation of levers 19 and 20 and of springs 21, 22. Shaft 18 moves spring bolt 65 through the intervention of lever 20 which is advantageously designed as a leaf spring. Spring bolt 65 tensions spring 22 through the intervention of bushing 66 and spring disc 35 in one direction. The spring stroke is limited by the abutment bushing 36. In the other direction, spring 22 is tensioned through the head 41 of bolt 65, a disc 37, and a threaded bushing 38. In order to permit the adjustment of the device to a desired clamping pressure, the second spring disc 39 threadedly engages bushing 38. The limit switch 25 is actuated by a bolt 67 mounted on lever 20, whereas the limit switch 26 is actuated by bolt 68 through lever 69.

Similarly, the shaft 17 acts upon spring 21 through lever 19 and spring bolt 70, bushing 72 and spring cup 21. The spring is tensioned in the other direction by the collar 74 of bolt 70 and by spring cup 75. The limit switches 23, 24 are respectively actuated by lever 19 and spring bolt 70 connected to lever 19.

FIGS. 9 and 10 illustrate a modification of the drive according to FIGS. 1 to 8. According to the said modification, the two motors 5 and 6 are always of the same size and are arranged on the same drive or transmission side while being parallel to each other.

There are certain constructions in which the just mentioned arrangement is particularly advantageous. Examples of such constructions are shown in FIGS. 11 to 13. Thus, FIG. 11 illustrates a drive according to the present invention for a fast traverse clamping drilling device. According to this device, the drilling table 40 has journalled therein a clamping bar 40a with the clamping jaw 42 and the drilling bushing 43. The said clamping bar 40a is adjustable toward and away from the work piece 44. The clamping bar 40a is partly designed as a rack 45 which through the intervention of a transmission 46 is operatively connected to a pinion 47 which latter is keyed to the output shaft 2 of the clamping drive 1.

FIG. 12 shows a drive according to the invention in combination with a hydraulic piston 48 for conveying hydraulic pressure to a clamping piston 49. According to this arrangement, the output shaft 2 threadedly engages a correspondingly threaded bore in the hydraulic piston 48 which is guided in cylinder 76 by means of shaft 2, the piston 48 may be reciprocated. The pressure is transmitted through conduit 49 movably mounted in cylinder 78. By means of the arrangement shown in FIG. 12, it is possible to clamp a work piece 50 upon a support 51. Inasmuch as the pressure can be uniformly distributed to a plurality of pistons, a uniform work piece clamping action can be obtained.

FIG. 13 shows a clamping drive according to the invention as employed for a vise. In FIG. 13, the bed of the vise is designated with the reference numeral 52. The vise is equipped with a stationary jaw 53. Mounted on bed 52 is a movable jaw 54 which is displaceable relative to the stationary jaw 53. The pinion 79 of the drive shaft 2 of transmission 1 meshes with a pinion 80 of drive shaft 81 of the movable vise jaw 54. The end of this drive shaft is designed as a screw engaging a corresponding thread in the movable clamping jaw 54 so that in this way jaw 54 can be moved back and forth.

According to the invention it is particularly advantageous to design the motors as universal motors, i.e. to provide the motors with windings for both clockwise and counter-clockwise rotation.

FIG. 14 shows a wiring diagram of such a universal motor. In said diagram, FE1 indicates the winding for the clockwise rotation, for instance of fast traverse motor 5, whereas FE2 indicates the winding for the counter-clockwise rotation of the fast traverse motor 5.

When employing such universal motors, the wiring diagram of FIG. 15 is particularly advantageous. FIG. 15 shows the control between the two phases R and T. The manually operable switch for clamping and disengaging is designated with the reference character P1. Upon actuating P1 for a clamping operation, both motors 5 and 6 rotate in the direction of the arrow with windings FE1 and FS1. When the clamping jaws engage the work piece to be clamped, shaft 17 by means of lever 19 moves first and turns off fast traverse motor 5 by means of limit switch 24. Subsequently, shaft 18 by means of lever 20 turns off clamping motor 6 through the intervention of limit switch 26. When switch P1 is shifted for an unclamping operation, switches 23 and 25 will be made effective so that current will be interrupted in the counter windings FE2 and FS2 to stop the device. Ordinary commercial motors may be employed.

The above mentioned diagram makes it possible to carry out an additional clamping in both directions. When the pressure drops, the levers will through the corresponding switches again turn on the motors which after producing the clamping pressure will be turned off through the intervention of the travelling worms, shafts and levers.

The electric diagram shown in FIG. 15 is intended for control conditions in which the clamping operation is effected when the work piece is being engaged by the clamping jaw so that the clamping motor has to overcome merely a certain elastic deformation of work piece and clamping device. With this arrangement, the turning off of the two motors is effected in such quick succession that the turned off fast traverse motor will due to its inertia act against the spring, whereas the braking device actuated by the clamping motor already becomes effective. The braking of the fast traverse worm will thus become effective prior to the fast traverse motor springing back. However, in order to be able to master other clamping problems, certain alterations may be effected with the clamping drive according to the invention. Thus, for instance, clamping operations may be necessary in which the elastic deformation of work piece and clamping device may practically be neglected. In this instance, it is required to turn off the fast traverse motor prior to turning off the clamping motor. The fast traverse motor may after having overcome the resistance of the spring associated therewith further receive current until it is turned off simultaneously with the clamping motor. This idling period is generally below one hundredth of a second. For this purpose, the arrangement may be further simplified inasmuch the limit switches for the fast traverse motor would be superfluous.

The number of contacts remains inasmuch as the switch contacts for the fast traverse motor in the common limit switch pair have to be provided for both motors. Such simplified arrangement with only one limit switch pair common to both motors is illustrated in FIG. 16. According to FIG. 16, lever 17 is electrically without effect. Lever 17 and spring 21 associated therewith merely serve the purpose of cushioning the final phase of operation of the fast traverse motor.

Of importance are also those instances in which the clamping under pressure will be obtained only after a longer clamping time or longer clamping stroke. If, for instance, the clamping action is carried out through the intervention of a composite hydraulic pressure distributing system, the end pressure builds up only gradually because the pressure oil in the various pipes will act like a spring. Only after the oil column has been compressed to a certain extent, will the end pressure be obtained and can the clamping motor be turned off. Such a clamping operation may be obtained with the arrangement of FIG. 12 provided certain changes have been made which are shown in FIGS. 7a and 8a. According to FIG. 7a, the braking disc 31 shown in FIG. 7 is resilient in such a way that it is composed of a plurality of thin leaf spring-like acting discs 31a. FIG. 8a in contrast to FIG. 8 shows a gap between the spring bolt 41 and the disc 37. As soon as with this arrangement due to the engagement of the work piece, a pressure increase occurs which has such a magnitude that the fast traverse motor will be turned off, also lever 20 is moved, namely by the amount "s". This does not yet bring about a switch-over. However, the pressure disc 1a will be actuated to such an extent that the braking device will lock the fast traverse worm and prevent the same from rotating in reverse direction. Only after the clamping pressure has increased to such an extent that the thrust of spring 22 will be overcome, the clamping motor will be turned off. Inasmuch as the disc 31a is resilient, it will be moved further so that the clamping action will be increased.

It is, of course, to be understood that the present invention is, by no means, limited to the particular constructions shown in the drawings but also comprises any modifications within the scope of the appended claims.

What I claim is:

1. In an electromechanical clamping system: a planetary gear transmission, a first worm wheel and a second worm wheel, said transmission also having an output shaft drivingly connected via planetary gearing to both said first worm wheel and said second worm wheel, a fast traverse motor, a first travelling worm meshing with said first worm wheel and being drivingly connected to said fast traverse motor, a clamping motor, a second travelling worm meshing with said second worm wheel and drivingly connected to said clamping motor, each of said worms being axially resiliently displaceable, and means responsive to axial movement of said worms for de-energizing the respective drive motors therefor.

2. In an electromechanical clamping system: a planetary gear transmission, a first worm wheel and a second worm wheel, said transmission also having an output shaft drivingly connected via planetary gearing to both said first worm wheel and said second worm wheel, a fast traverse motor, a first travelling worm meshing with said first worm wheel and being drivingly connected to said fast traverse motor, a clamping motor, a second travelling worm meshing with said second worm wheel and drivingly connected to said clamping motor, each of said worms being axially resiliently displaceable in response to a predetermined resistance to rotation of the respective worm wheel, clamping jaws operatively connected to said output shaft, limit switch means controlling said fast traverse motor and operable in response to movement of the respective travelling worm brought about by said clamping jaws hitting an abutment to bring about de-energization of said fast traverse motor, there being other limit switch means responsive to axial movement of the other worm for de-energizing said clamp motor.

3. In an electromechanical clamping system: a planetary gear transmission, a first worm wheel and a second worm wheel, said transmission also having an output shaft drivingly connected via planetary gearing to both said first worm wheel and said second worm wheel, a fast traverse motor, a first travelling worm meshing with said first worm wheel and being drivingly connected to said fast traverse motor, a clamping motor, a second travelling worm meshing with said second worm wheel and drivingly connected to said clamping motor, each of said worms being axially resiliently displaceable in response to a predetermined resistance to rotation of the respective worm wheel, clamping jaws operatively connected to said output shaft, and limit switch means controlling said motors and operable in response to movement of the respective travelling worm brought about by said clamping jaws hitting an abutment to bring about de-energization of said fast traverse motor, said limit switch means also including switch means responsive to axial movement of the other worm brought about by development of the desired clamping pressure by said clamping jaws for de-energizing said clamping motor.

4. A clamping system according to claim 1, in which said first travelling worm is a high pitch non self-locking worm for obtaining a high fast traverse speed.

5. In an electromechanical clamping system: a planetary gear transmission, a first worm wheel and a second worm wheel, said transmission also having an output shaft drivingly connected via planetary gearing to both said first worm wheel and said second worm wheel, a fast traverse motor, a first travelling non-self-locking worm meshing with said first worm wheel and being drivingly connected to said fast traverse motor, a clamping motor, a second travelling self-locking worm meshing with said second worm wheel and drivingly connected to said clamping motor, each of said worms being axially resiliently displaceable, mechanical brake means associated with said first worm operable when actuated for braking the same, connecting means extending from said second worm to said brake means operable for causing the axial displacement of said second worm to actuate the brake means, said connecting means and said brake means being operable quickly to brake said first worm to a halt after de-energization of said fast traverse motor while preventing said first worm from turning in the reverse direction, and means responsive to axial movement of said worms for de-energizing the respective drive motors therefor.

6. In an electromechanical clamping system: a planetary gear transmission, a first worm wheel and a second worm wheel, said transmission also having an output shaft drivingly connected via planetary gearing to both said first worm wheel and said second worm wheel, a fast traverse motor, a first travelling worm meshing with said first worm wheel and being drivingly connected to said fast traverse motor, a clamping motor, a second travelling worm meshing with said second worm wheel and drivingly connected to said clamping motor, each of said worms being axially displaceable, resilient means normally holding each worm in a predetermined axial position, limit switch means arranged to be actuated by said travelling worms when moving in either direction from said predetermined position, said switch means being operable for energizing the motor for the pertaining worm, and said limit switch means being operable again to energize said motors to restore the clamping pressure in response to movement of said worms back toward said predetermined position as occasioned by a drop in the clamping pressure following a clamping operation.

7. A clamping system according to claim 1, in which the planetary gear transmission comprizes compound planet pinions having a slight difference only in their pitch diameter to produce a high transmission ratio between said clamping motor and said output shaft.

8. In an electromechanical clamping system: a planetary gear transmission comprizing a sun gear, compound planet pinion means having one pinion means meshing with said sun gear, an output gear meshing with the other pinion means of the compound planet pinion means, and a planet pinion means carrier, a first worm wheel connected to said sun gear and a second worm wheel also having an output shaft drivingly connected to said output gear, a fast traverse motor, a first travelling worm meshing with said first worm wheel and being drivingly connected to said fast traverse motor, a clamping motor, a second travelling worm meshing with said second worm wheel and drivingly connected to said clamping motor, each of said worms being axially resiliently displaceable, resilient means biasing said worms toward a predetermined axial position, clamping jaws operatively connected to said output shaft to be moved in clamping and unclamping movements thereby, limit switch means in circuit with said two motors, and means responsive to axial movement of said worms for actuating said limit switch means to control the energization of said motors.

9. In an electromechanical clamping system: a planetary gear transmission comprizing a sun gear, compound planet pinion means having one pinion means meshing with said sun gear, an output gear meshing with the other pinion means of the compound planet pinion means, and a planet pinion means carrier, a first worm wheel connected to said sun gear and a second worm wheel connected to said carrier, said transmission and also having an output shaft drivingly connected to said output gear, a fast traverse motor, a first travelling non-self-locking worm meshing with said first worm wheel and being drivingly connected to said fast traverse motor, a clamping motor, a second travelling self-locking worm meshing with said second worm wheel and drivingly connected to said clamping motor, each of said worms being axially displaceable, resilient means biasing said worms toward a predetermined axial position, mechanical brake means associated with said first worm for braking the same, and means responsive to an axial displacement of said worms for respectively turning off first said fast traverse motor and then said clamping motor and for actuating said brake.

10. In an electromechanical clamping system: a planetary gear transmission comprising a sun gear, compound planet pinion means having one pinion means meshing with said sun gear, an output gear meshing with the other pinion means of the compound planet pinion means, and a planet pinion means carrier, a first worm wheel connected to said sun gear and a second worm wheel connected to said carrier, said transmission and also having an output shaft drivingly connected to said output gear, a fast traverse motor, a first travelling non-self-locking worm meshing with said first worm wheel and being drivingly connected to said fast traverse motor, a clamping motor, a second travelling self-locking worm meshing with said second worm wheel and drivingly connected to said clamping motor, each of said worms being axially displaceable, resilient means biasing said worms toward a predetermined axial position, mechanical brake means associated with said first worm actuatable for braking the same, said brake means including a composite brake disc composed of a plurality of thin leaf-like discs, actuating means for conveying the axial displacement of said second worm to said brake means to actuate said brake means, said actuating means and said brake means being operable quickly to brake said first worm to a halt and to lock the same after de-energization of said fast traverse motor to prevent said first worm from turning in the reverse direction and springing back, and means responsive to axial movement of said worms for de-energizing their respective motors.

11. In an electromechanical clamping system: a planetary gear transmission comprising a sun gear, compound planet pinion means having one pinion means meshing with said sun gear, an output gear meshing with the other pinion means of the compound planet pinion means, and a planet pinion means carrier, a first worm wheel connected to said sun gear and a second worm wheel connected to said carrier, said transmission having an output shaft drivingly connected to said output gear, a fast traverse motor, a first travelling worm meshing with said first worm wheel and being drivingly connected to said fast traverse motor, a clamping motor, a second travelling worm meshing with said second worm wheel and drivingly connected to said clamping motor, each of said worms being axially displaceable, lever means operatively connected to each said worm movable thereby in response to axial movement of the respective worm, spring means urging said lever means into a certain position, and means respectively arranged at opposite ends of said spring means in spaced relationship to each other and operable to tension said spring means in opposite direction.

12. In an electromechanical drive; co-axial input and output gears of different diameter, compound planet pinion means having one pinion meshing with each said gear, a carrier for said planet pinion means, a first worm wheel connected to said input gear, a second worm wheel connected to said carrier, first and second worms meshing respectively with said first and second worm wheels, a motor drivingly connected to each worm, each worm being axially displaceable without interrupting its connection with its pertaining motor or worm wheel, resilient means biasing each worm toward a predetermined axial position yieldable to permit movement of the respective worm in either direction, an energizing circuit for each motor, normally closed limit switch means in each circuit, and means responsive to axial displacement of said worms for actuating said limit switch means to interrupt the energizing circuit at least to the motor pertaining to the axially displaced worm, said first worm and worm wheel being of a non-self-locking pitch and providing a lower drive ratio between the pertaining motor and said output gear and said second worm and worm wheel being of a self-locking pitch and providing a higher drive ratio between the pertaining motor and said output gear, a brake associated with said first worm, and means connecting said second worm with said brake responsive to axial displacement of the said second worm for actuating said brake to lock said first worm.

13. In an electromechanical drive; co-axial input and output gears of different diameter, compound planet pinion means having one pinion meshing with each said gear, a carrier for said planet pinion means, a first worm wheel connected to said input gear, a second worm wheel connected to said carrier, first and second worms meshing respectively with said first and second worm wheels, a motor drivingly connected to each worm, each worm being axially displaceable without interrupting its connection with its pertaining motor or worm wheel, resilient means biasing each worm toward a predetermined axial position yieldable to permit movement of the respective worm in either direction, an energizing circuit for each motor, normally closed limit switch means in each circuit, and means responsive to axial displacement of said worms for actuating said limit switch means to interrupt the energizing circuit at least to the motor pertaining to the axially displaced worm, said first worm and worm wheel being of a non-self-locking pitch and providing a lower drive ratio between the pertaining motor and said output gear and said second worm and worm wheel being of a self-locking pitch and providing a higher drive ratio between the pertaining motor and said output gear, a brake associated with said first worm, and means connecting said second worm with said brake responsive to axial displacement of the said second worm for actuating said brake to lock said first worm, said means connecting said second worm with said brake being resilient to permit axial displacement of the second worm beyond what is required to actuate said brake, and the limit switch means responsive to axial displacement of said second worm being adapted for actuation only when said second worm is displaced beyond its brake actuating position.

References Cited in the file of this patent

UNITED STATES PATENTS

| | | | |
|---|---|---|---|
| 1,837,803 | Weston | Dec. 22, | 1931 |
| 2,054,760 | Oberhoffken | Sept. 5, | 1936 |
| 2,300,343 | Clay | Oct. 27, | 1942 |
| 2,484,616 | Dulaney | Oct. 11, | 1949 |
| 2,600,568 | Nelson | June 17, | 1952 |
| 2,734,408 | Smith | Feb. 14, | 1956 |
| 2,785,369 | Ligh | Mar. 12, | 1957 |